(No Model.)
E. D. ANDERSON.
BICYCLE BRAKE.
No. 597,932. Patented Jan. 25, 1898.
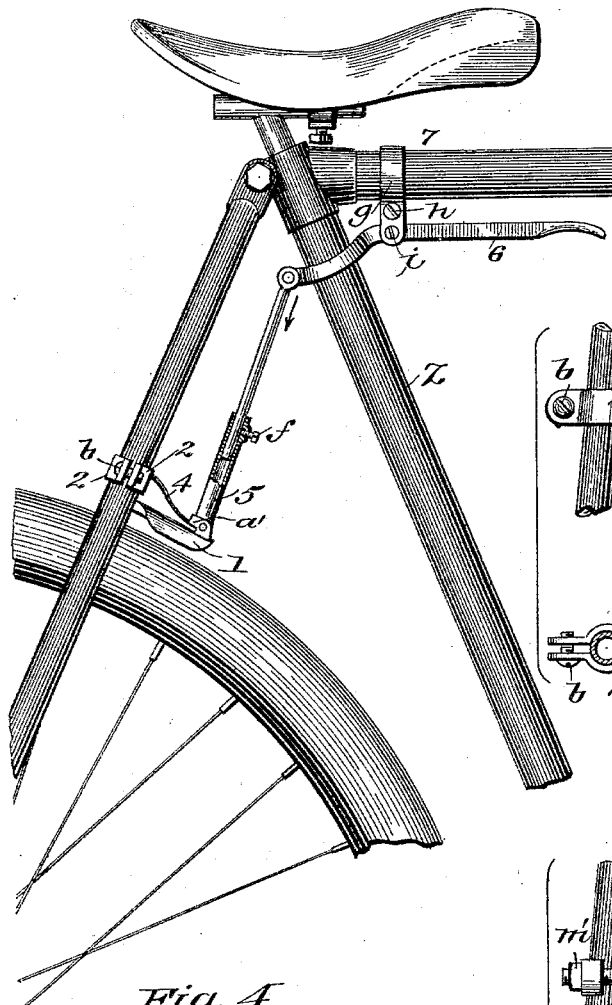
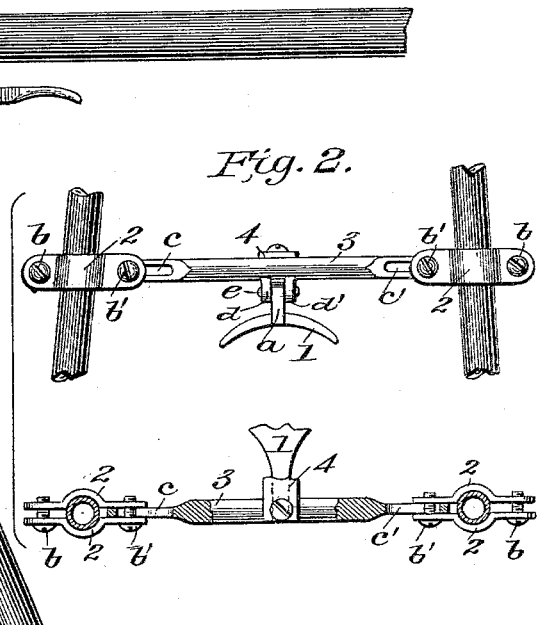
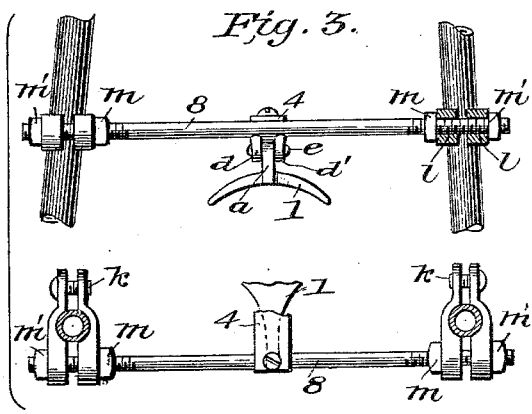
WITNESSES:
INVENTOR
Edward D. Anderson.
ATTORNEY.

UNITED STATES PATENT OFFICE.

EDWARD D. ANDERSON, OF WASHINGTON, DISTRICT OF COLUMBIA.

BICYCLE-BRAKE.

SPECIFICATION forming part of Letters Patent No. 597,932, dated January 25, 1898.

Application filed December 5, 1896. Serial No. 614,571. (No model.)

*To all whom it may concern:*

Be it known that I, EDWARD D. ANDERSON, a citizen of the United States, residing at Washington, in the District of Columbia, have invented certain new and useful Improvements in Bicycle-Brakes; and I do declare that the following is a clear, full, and exact description of the invention, which will enable others skilled in the art to which it appertains to use the same.

My invention relates to bicycle-brakes, and it has reference to the particular class of such brakes which are employed to operate upon the rear wheel.

For various reasons a brake which operates upon the rear wheel is usually considered preferable to one which operates upon the front wheel; but owing to the usual construction of brakes of this character, the operating element of which is often attached to the handle-bars, thus necessitating a multiplicity of parts, such devices are rendered impracticable because they are cumbersome, are apt to become loose where their various parts are connected, and are more or less an interference to the rider's free movements. Moreover, in view of the present designs upon which handle-bars are constructed a brake cannot be conveniently attached to them.

The brake which I have devised obviates all the above faults because it is simple, is so constructed as to be readily attached to a portion of the bicycle-frame where it is least exposed, and at the same time is within reach of the rider's hand.

Referring to the accompanying drawings, Figure 1 is a view of a section of a bicycle-frame with part of the rear wheel, showing my brake in position. Fig. 2 shows a preferable form of the brake-hanger. Fig. 3 shows a modified form of the brake-hanger. Figs. 4 and 5 show certain details of the invention.

To the pair of uprights of the bicycle-frame, which extend from the saddle-post to the rear-wheel axle, and in operative contiguity to the periphery of said wheel a brake-shoe 1 is mounted. Said brake-shoe is shaped like the ordinary brake-shoe for bicycles and is provided with the usual upwardly-extending perforated ear $a'$.

Adjustably secured to clamps 2, comprising two sections having securing-bolts $b\,b'$, is a cross bar or hanger 3, the ends of which are flattened and are provided with longitudinally-extending slots $c\,c'$. Said rod is provided with downwardly-extending ears $d\,d'$, between which and to which the brake-shoe is pivotally connected, being fulcrumed at its rear end $a$ on the pin or bolt $e$, which passes through said ears $d\,d'$.

Above the projections or ears $d\,d'$ and rigidly secured at one of its ends to the cross-bar 3 is a flat spring 4, which projects forward and is in contact with the end $a'$ of the brake-shoe. Said end is cut away to receive the free end of the spring, the normal tendency of which is thus to raise the brake-shoe out of contact with the periphery of the wheel.

By means of the slots $c\,c'$, which, as has been described, are situated in the flattened ends of the cross-bar, and the bolt $b'$, which passes through each of them, the bar carrying the brake-shoe is made adjustable laterally, so that it is thus possible to always arrange the brake-shoe to operate squarely upon the periphery of the wheel. It is also possible to adjust the brake-shoe toward or away from the wheel by means of said bolts $b'$, which, with bolts $b$, are adapted to secure the clamp 2 to the uprights of the frame.

Pivoted at one end in the perforated ear $a'$ of the brake-shoe is a telescopic connecting-rod 5, the sections of which are secured together by binding-screw $f$, by which means said rod is made adjustable to any desired length. In order to bring the rod closer to the uprights of the frame, the ear $a'$, in which said rod is pivoted at one end, may be situated nearer to the point where said brake-shoe is fulcrumed. Connected at one of its ends to the upper end of said connecting-rod is a lever 6, fulcrumed near its center and extending beneath the horizontal bar of the bicycle-frame. Said lever is so shaped as to pass around the upright Z of the frame, thus avoiding interference with the same. Its free end is provided with the usual hand-grip.

The support to which the lever 6 is fulcrumed consists of a clamp 7, comprising two portions $g\,g'$, secured together and clamped to the frame by a bolt $h$. Below said bolt another bolt $i$ extends through the portions of the clamp and forms a fulcrum for the lever.

I have described what I consider the preferable form of the device for securing the brake-shoe to the uprights of the frame; but in Fig. 3 is shown another form of the hanger. It consists of a cross-bar 8, similar to the cross-bar 3, already described, except that its ends are threaded instead of slotted and flattened. Clamps for receiving the ends of said hanger are secured to the uprights by means of a bolt $k$, which passes through and binds together the sections of each clamp. A perforation $l$ of the clamp-sections receives the threaded ends of the cross-bar, which are provided with binding-nuts $m$ $m'$, situated on either side of the clamp. As already intimated, the means for pivoting the brake-shoe and for mounting the flat spring which actuates the shoe may be substantially the same in respect of this cross-bar as the corresponding parts in the cross-bar 3.

It may be found desirable to substitute for the spring herein described a spring of another form and adapted to operate differently or in a different position. I therefore do not wish to be limited to the spring herein shown and described.

The brake herein described is not only simple in construction, inexpensive, and effective in its operation, but owing to its proximity to the seat of the rider may be quickly and easily grasped.

I do not wish to be limited to the exact form of brake herein shown and described; but

What I claim is—

1. The combination with a safety-bicycle, of a hand-operative brake apparatus consisting of a brake-shoe adapted to operate upon the rear wheel of said bicycle, an operating-lever, and suitable means for causing them to move in unison, the said lever being situated close to the seat of the bicycle and fulcrumed so as to adapt it to receive force in an upward and substantially vertical direction, substantially as described.

2. The combination with a safety-bicycle, of a hand-operative brake apparatus consisting of a brake-shoe adapted to operate upon the rear wheel of said bicycle, a horizontal operating-lever fulcrumed upon and beneath the horizontal bar of said bicycle-frame, and suitable means for causing them to move in unison, the said lever being situated close to the seat of the bicycle and adapted to receive force in an upward and substantially vertical direction, substantially as described.

3. In a brake for a safety-bicycle, a support secured to the frame of said bicycle, a brake-shoe pivoted thereto and having a perforated ear on its free end, an operating-lever suitably connected to said ear, situated close to the seat of said bicycle and fulcrumed to receive force in an upward and substantially vertical direction, and a flat retractile spring for the brake-shoe secured to the support at one of its ends and having its free end in operative contact with the ear on said brake-shoe, substantially as described.

In testimony whereof I affix my signature in presence of two witnesses.

EDWARD D. ANDERSON.

Witnesses:
H. A. BIGLEY,
HAVILAND STEVENSON.